United States Patent
White

(10) Patent No.: US 7,581,181 B2
(45) Date of Patent: Aug. 25, 2009

(54) METHOD FOR CONTEXTUAL ASSISTANCE MANAGEMENT

(75) Inventor: Gabriel J. White, Beijing (CN)

(73) Assignee: Motorola, Inc., Schaumburg, IL (US)

( * ) Notice: Subject to any disclaimer, the term of this patent is extended or adjusted under 35 U.S.C. 154(b) by 296 days.

(21) Appl. No.: 11/459,574

(22) Filed: Jul. 24, 2006

(65) Prior Publication Data

US 2008/0168351 A1  Jul. 10, 2008

(51) Int. Cl.
G06F 15/00 (2006.01)
G06F 13/00 (2006.01)

(52) U.S. Cl. ...................... 715/707; 715/709

(58) Field of Classification Search ......... 715/705–709, 715/702, 714, 851–853
See application file for complete search history.

(56) References Cited

U.S. PATENT DOCUMENTS

2004/0088273 A1   5/2004  Mutsuno et al.
2004/0171375 A1*  9/2004  Chow-Toun ............... 455/418
2006/0073462 A1*  4/2006  Tetreault .................... 434/322
2006/0080607 A1*  4/2006  Cohen et al. ............... 715/705

FOREIGN PATENT DOCUMENTS

EP   0323381 A   7/1989
EP   1150204 A  10/2001

* cited by examiner

Primary Examiner—Kevin Nguyen
(74) Attorney, Agent, or Firm—Gary J. Cunningham

(57) ABSTRACT

A method for contextual assistance application management is disclosed. The method comprises launching a help application, determining, by the help application, that a predefined event has occurred with a target application and presenting, in response to the occurrence of the predefined event, a help feature on a user interface. Then, determining that the help feature has been presented a predetermined number of times; and as a result disabling the help feature.

12 Claims, 2 Drawing Sheets

METHOD FOR CONTEXTUAL ASSISTANCE MANAGEMENT

FIELD OF THE DISCLOSURE

The present disclosure relates generally to software assistance and more particularly to automatic enabling and disabling thereof.

BACKGROUND OF THE DISCLOSURE

Help applications often accompany computer software applications to assist the operator with the use of the application. The help application when enabled by the user is presented to the user on the user interface to guide the user in executing and performing functions with the target application. In some cases the help application may be called up by the user and may provide a search window to allow the user to search for help topics. The help application may provide tips or shortcuts in response to predefined user actions with the target application.

Over time, the help application presents the same tips over and over. The user, after a given period of experience with the software, is proficient enough that the help program or specific tips presented by the help program are no longer necessary.

Help applications may also be manually enabled and disabled by the user. Software on computer systems may often ship to the customer with the help application enabled to help guide the new user through the operation of the new computer system. However if a first user disables the help application prior to use by second user, the second user does not have the benefit of the help application.

The various aspects, features and advantages of the present disclosure will become more fully apparent to those having ordinary skill in the art upon careful consideration of the following Detailed Description thereof with the accompanying drawings described below. The drawings may have been simplified for clarity and are not necessarily drawn to scale.

BRIEF DESCRIPTION OF THE DRAWINGS

The present invention is illustrated by way of example and not limitation in the accompanying figures, in which like references indicate similar elements.

Figure 1:
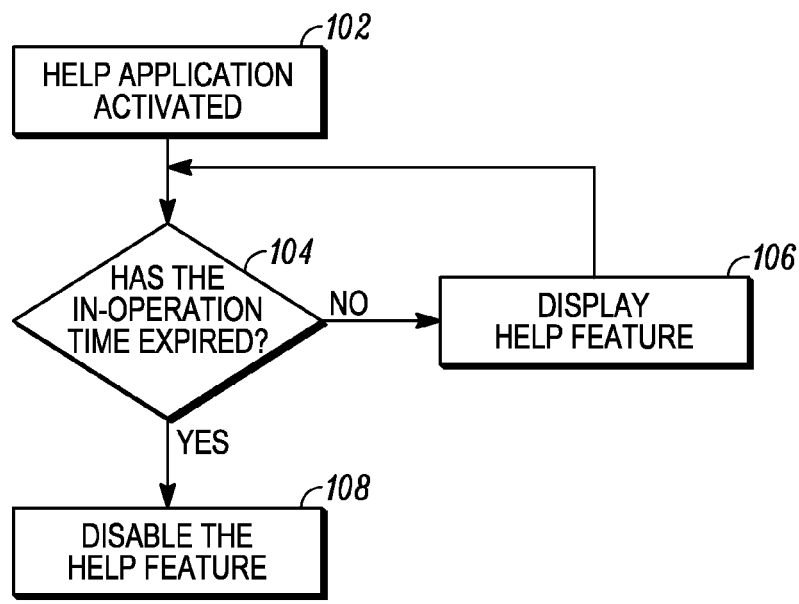
FIG. 1 illustrates an exemplary flow diagram for help application management.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In general, a method for help application management is disclosed. In a first embodiment, the method comprises automatically disabling contextual assistance system after a calculated or fixed number of uses. In particular, the method comprises enabling a help application which provides contextual assistance to the user in response to the startup of a target application. Tracking the number of times a help feature is presented to the user. Then disabling the help feature after a predetermined time or a predetermined number of presentations of the help feature.

Before describing in detail embodiments that are in accordance with the present invention, it should be observed that the present invention resides primarily in combinations of method steps. Accordingly, the method steps have been represented where appropriate by conventional symbols in the drawings, showing only those specific details that are pertinent to understanding the present invention, so as not to obscure the disclosure with details that will be readily apparent to those of ordinary skill in the art, having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 illustrates an exemplary flow diagram showing the method for disabling a help application. In the first step the help application is launched. The help application may have a plurality of help features that are presented in a plurality of operational forms (e.g. search windows, pop-up windows, comments, instructional demonstrations, instructional video, audio or the like). The help application determines if predefined event has occurred during the execution of a target application and whether to accordingly present contextual assistance with the help feature to the user.

The help application determines which help feature and in what operation form to present to the user typically via user interface such as a display or speaker. One example of a help feature is topic searching. For example, the help application may provide a search window (the search window being the operational form of the help feature) to allow the user to search for help topics. In another example, a help feature is a "tip" such as a shortcut method that is displayed in a pop-up window indicating a command to use instead of a series of keystrokes for example. It is understood that the help application may provide help information by way of a plurality of help feature types and present the in a plurality of operational forms.

The step of launching the help application may be accomplished by programming the help application in the manufacture process to launch during the initial startup or launching by the user or subsequently upon the installation of the help application onto a device. The user may manually turn on the help application in another embodiment. Or still, in yet another embodiment, the help application may have been automatically enabled in response to an event that has occurred, i.e. a help application launching event such as the installation of a target application as discussed above.

Once the help application is launched, help features may be triggered and presented in response to events that occur in the target application. For example, a user has repeatedly caused an error to occur or the user attempts to enter alphabetic text in a numeric field several times in a row. The event may occur in the device or as the result of the execution of another software application. For example a first application such as a mail application uses a second application to view a particular mail enclosure however the second application is not available. It is to be understood that one help application may also monitor a plurality of target applications for help feature enabling events.

After the launch of the target application and during operation thereof, the help application determines 104 whether the in-operation time of the particular help feature has expired. The in-operation time of the help feature is, in one embodiment, a predetermined length of time. For example, a timer is started at the first time a target application is launched and runs for a predetermined amount time. If the in-operation time has expired then the help feature is disabled 108, i.e. help application disablement. If the in-operation time has not expired then the help feature is displayed 106. In this embodiment, the help feature may be re-enabled manually by the user by turning the help feature on in the software. In another embodiment, the help feature may be displayed a certain number of time before it is disabled.

Figure 2:
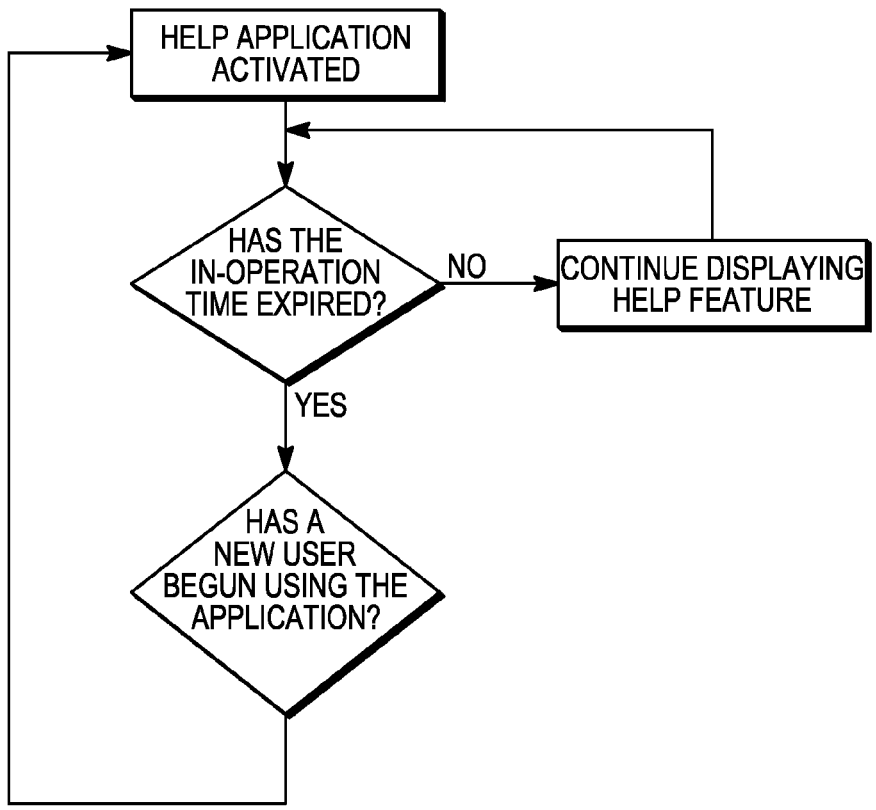
FIG. 2 illustrates an exemplary flow diagram for help application management.

In another embodiment, illustrated in an exemplary flow diagram of FIG. 2, subsequent to the disablement of the help application or help feature, a help application management algorithm re-enables the help application or help feature when a new user is detected. In this embodiment, the help application or in another embodiment a particular help feature of the help application, has already been disabled 202 as discussed above. The method comprises detecting 204 a new user of the help application. In one embodiment, a subscriber identity module (SIM) detector, detects the insertion of a new SIM into the device. In this embodiment the help application management algorithm determines 204 that a new SIM has been inserted and enables 206 the help application. The help application management software may track (i.e. store in a memory) the unique identification of each SIM inserted in to the device. In one embodiment the SIM has an International Mobile Subscriber Identity IMSI number that uniquely identifies the user and may be used as the unique identification of the SIM.

Upon insertion of a SIM into the device, the help application management software compares the SIM identification number to the stored SIM identification numbers. If there is no match the help application particular help feature is re-enabled. In another embodiment, the target application requires the user to login. If new user, different than any previous users logs into he software, the help application is re-enabled. The help application management software may also monitor which user is logged into the device. Similar to above, if a new user has logged into the device, the help feature will be re-enabled.

Figure 3:
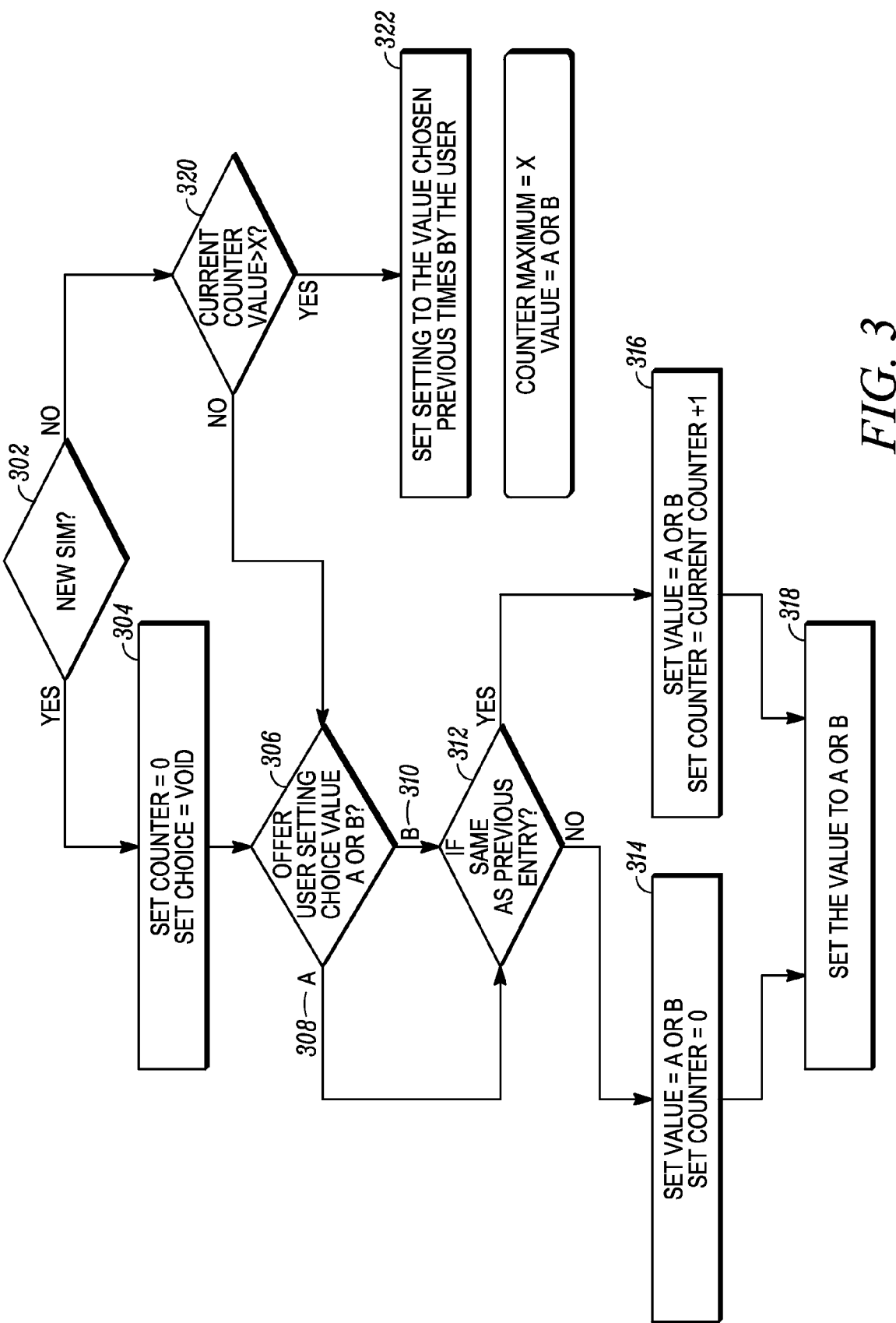
FIG. 3 illustrates an exemplary flow diagram for help application management.

FIG. 3 illustrates exemplary flow diagram for the help application upon the insertion of a new SIM card. In this embodiment, when a new SIM card is detected 302, a feature presentation counter is set to zero and a choice is set to "void." Then the help application offers the user a setting choice of "A" or "B" in this embodiment. It is understood that more choices may be available and that two are used in this embodiment for exemplary purposes. The help application determines 312 whether the user's selection of "A" 308 or "B" 310 is the same as the previous selection. If the selection is not the same, the help application set 314 the user choice to correct user choice and then sets the feature presentation counter to zero. If the user choice is the same, then set the value to the correct choice and then set the feature presentation counter to the value of the current counter plus one. Then set the user value to the value as selected, i.e. "A" or "B."

As discussed above, if a new SIM is not detected, the feature presentation counter determines 320 whether the help feature has been presented more than the predetermined number of times. If the feature has been presented more than the predetermined number of times (i.e. value>X), then the value is set 322 to the value previously chosen by the user. For example, when the user powers on the devices or starts up the target application, the user is questioned as to whether voice prompts should be activated. If the user selects "No" three times in a row, the device will indicate to the user that it will no longer present the voice prompt option and upon the next startup, the user will not be asked if the voice prompt option is desired, which was the value chosen previously by the user. In this way, the user does not need to hunt though software menus and settings to disable the voice prompts.

For example, in one embodiment, the help application may be set to on or off. When the user purchases a device, for example, and uses it for the first few times they are not sure if they want the feature on or off. Each time the user powers on the device, it asks if they would like to use the feature. For example, in one scenario, for the first three times the user chooses 1. ON, 2. OFF, 3. ON. Then, the user decides they do not want the feature, however finding where to manually turn off the feature in the settings would be difficult. Instead, for the next X times (three in this exemplary embodiment) the user chooses OFF, the counter is set to 3, so after the user has said OFF 3 times the device will not ask the user if they want to turn the feature ON or OFF.

While the present disclosure and the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A computer readable storage medium including instructions for performing a method for help application management in an electronic device, comprising:
   detecting a user;
   enabling a help application;
   launching the help application;
   determining, by the help application, that a predefined event has occurred with a target application;
   presenting, in response to the occurrence of the predefined event, a help feature on a user interface;
   determining that the help feature has been presented a predetermined number of times; and
   disabling a subset of help features of the help application, the subset comprising the help feature that has been presented the predetermined number of times upon determining that the help feature has been presented the predetermined number of times.

2. The computer readable storage medium of claim 1, further comprising:
   detecting that another user; and
   enabling at least the disabled help feature.

3. The computer readable storage medium of claim 2, wherein the step of detecting another user comprises detecting the insertion of a SIM card, different than the previous SIM card.

4. The computer readable storage medium of claim 2, wherein the step of detecting another user comprises tracking a SIM identification by the help application management software.

5. The computer readable storage medium of claim 2, wherein the step of detecting another user comprises determining that a new user has logged into the electronic device.

6. The computer readable storage medium of claim 2, wherein the step of detecting another user comprises determining that a new user has logged into the target software.

7. The computer readable storage medium of claim 2, wherein the step of detecting another user comprises prompting the user to enter a user identification.

8. The computer readable storage medium of claim 1, further comprising disabling all help feathers of a help application.

9. The computer readable storage medium of claim 1, wherein the step of disabling a subset of help features of the help application comprises disabling a plurality of help features of the help application upon determining that the help feature has been presented the predetermined number of times.

10. A computer readable storage medium including instructions for performing a method for help application management in an electronic device, comprising:
    detecting a user;
    launching a help application;
    determining, by the help application, that a predefined event has occurred with a target application;
    presenting, in response to the occurrence of the predefined event, a help feature of the help application to the user on a user interface; determining that the help feature has been presented to the user a predetermined number of times; and disabling presentation of a subset of help features of the help application.

11. The computer readable storage medium of claim 10, further comprising disabling presentation of all help features of the help application to the user after determining that the help feature has been presented to the user the predetermined number of times.

12. The computer readable storage medium of claim 10, further comprising disabling presentation of a plurality of help features of the help application to the user after determining that the help feature has been presented to the user the predetermined number of times.

* * * * *